358-190 SR

6/2/81 OR 4,271,432

United States Patent [19]

Suzuki et al.

[11] 4,271,432

[45] Jun. 2, 1981

[54] POWER SUPPLY CONTROL APPARATUS FOR A TELEVISION RECEIVER

[75] Inventors: Tadahiko Suzuki; Tomoaki Miyasaka; Toshio Amano, all of Tokyo, Japan

[73] Assignee: Sony Corporation, Tokyo, Japan

[21] Appl. No.: 109,338

[22] Filed: Jan. 3, 1980

[30] Foreign Application Priority Data

Jan. 12, 1979 [JP] Japan .................................... 54-2785

[51] Int. Cl.[3] .............................................. H04N 5/44

[52] U.S. Cl. ...................................... 358/190; 455/231

[58] Field of Search ................ 358/190; 455/230, 231, 455/343

[56] References Cited

U.S. PATENT DOCUMENTS 3,949,240 4/1976 Saito et al. ...................... 455/231 X

*Primary Examiner*—Robert L. Richardson

*Attorney, Agent, or Firm*—Lewis H. Eslinger; Alvin Sinderbrand

[57] ABSTRACT

A power supply control apparatus for a television receiver has a manually-actuable power switch for switching the power supply of the television receiver between its ON and OFF states, a digital timer for generating a time code representing the current time, a key input for generating a start-time code and an end-time code respectively representing programmable start and end times, a memory for storing the start-time and end-time codes, first and second coincidence detectors for generating first and second coincidence outputs whenever there is coincidence between the generated time code and the stored start-time and end-time codes, respectively, and a conditioning circuit for conditioning the power switch in response to the first and second coincidence outputs, so that the power switch is enabled and disabled, respectively, following the occurrence of the start and end times when the outputs of the timing circuit and the first memory coincide, a second coincidence detector for detecting the coincidence of the outputs of the timing circuit and the second memory and generating a second coincidence output when the outputs of the timing circuit and the second memory coincide, a first circuit responsive to the first coincidence output and for disabling or enabling the operation of the manual power switch, and a second circuit responsive to the second coincidence output and for enabling or disabling the operation of the manual power switch.

6 Claims, 3 Drawing Figures

POWER SUPPLY CONTROL APPARATUS FOR A TELEVISION RECEIVER

BACKGROUND OF THE INVENTION

1. Field of the Invention

The present invention relates generally to power supply control apparatus for a television receiver, and is directed more particularly to such a power supply control apparatus in which the television receiver is prevented from being switched between ON and OFF states at a predetermined time or can be switched between its ON and OFF states only at the predetermined time.

2. Description of the Prior Art

A power supply control apparatus for a television receiver is useful in preventing a child from watching a television for excessive lengths of time. There has been already proposed such an apparatus in which a key is used to mechanically lock the power switch of the television receiver.

Further, a television receiver has been proposed in which a timer apparatus is assembled as part of the television receiver. In this television receiver, when a viewer wants to view a program on a particular channel, the apparatus is programmed to that channel and the television receiver is locked so that, only the programmed channel can be watched.

Such a prior art apparatus is disadvantageous, as a key is necessary to lock the television receiver, and the key can be misplaced. Also, if it is desired to unlock or release the lock, and if there is no one at hand who has the key, the television receiver can not be used at all or it is not possible to view programs on channels other than the programmed channel.

OBJECTS AND SUMMARY OF THE INVENTION

Accordingly, an object of the present invention is to provide a novel power supply control apparatus for a television receiver which avoids the defects of the prior art.

Another object of the invention is to provide a power supply control apparatus for a television receiver which does not need a key.

According to an aspect of the present invention, there is provided a power supply control apparatus for a television receiver comprising a manually-actuable power switch for switching the power supply of the television receiver between its ON and OFF states, a timer for generating a time code representing the current time, a key input for generating a start-time code and an end-time code representing programmable start and end times, respectively, a memory for storing the start-time and end-time codes, first and second coincidence detectors for generating first and second coincidence outputs whenever there is coincidence between the generated time code and the stored start-time and end-time codes, respectively, and a conditioning circuit for conditioning the power switch in response to the first and second coincidence outputs, so that the power switch is enabled and disabled, respectively, following the occurrence of the start and end times.

In a desirable embodiment of the invention, the manually-actuable power switch can include a triggerable flip flop, and the conditioning circuit can include an RS flip flop which is set in response to the first coincidence output and reset in response to the second coincidence output so that the output of the RS flip flop acts to disable and enable a trigger signal following the start and end times, respectively.

The other objects, features and advantages of the present invention will become apparent from the following description taken in conjunction with the accompanying drawings through which the like references identify the same elements or parts.

DESCRIPTION OF THE PREFERRED EMBODIMENTS

Figure 1:
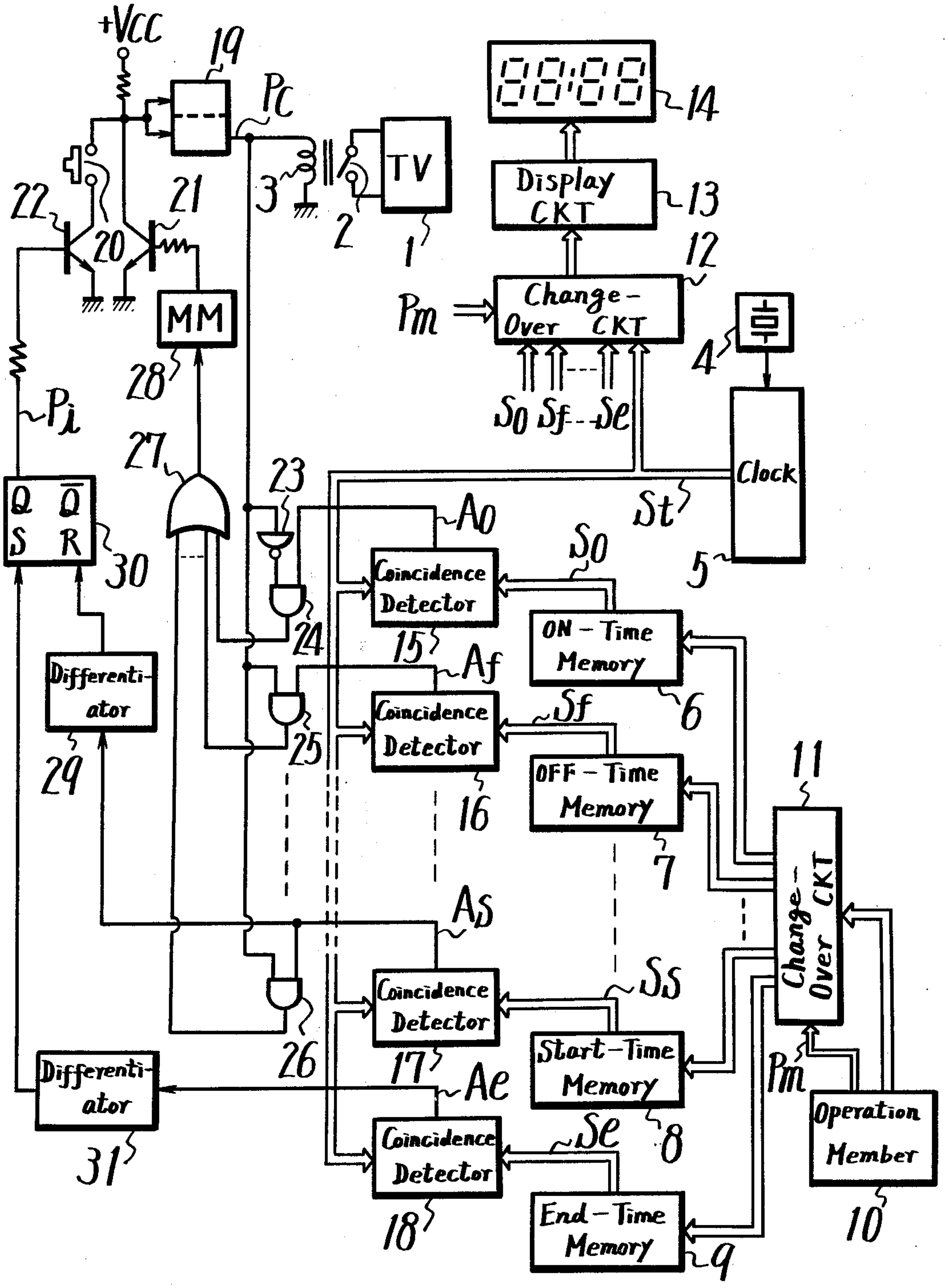
FIG. 1 is a block diagram showing an example of the power supply control apparatus for a television receiver according to the present invention.

A first example of the power supply control apparatus for a television receiver according to the present invention will be hereinafter described with reference to FIG. 1. In the example of FIG. 1, a timer apparatus is assembled in cooperative combination with a television receiver. In FIG. 1, a television receiver includes a power supply which is selectively is made ON and OFF by the cooperation of a relay contact 2 and a relay winding 3. However, a continuous power supply (not shown) various circuits form the timer apparatus remains ON via a commercial power source or battery so long as the receiver is plugged in.

A reference oscillator 4 such as a quartz oscillator or the like supplies a reference signal therefrom to a clock circuit 5. This clock circuit 5 includes a frequency divider circuit which frequency-divides the reference signal to produce a frequency-divided output of a one minute period, a decimal counter which is supplied with the frequency-divided output and which provides an output with a ten-minute period to a six-scale counter, which provides, in turn, a one-hour period signal to a twenty-four scale counter. Time code signals corresponding to one minute, ten-minutes, and one-hour are delivered from the respective counters and a time code St is formed of all the codes.

An ON-time memory 6 is provided which stores an ON-time code $S_O$ corresponding to the ON-time of the power supply. This ON-time memory 6 includes, as does the clock circuit 5, a plurality of counters and stores a desired ON-time (hour and minute) set by key operation in an operating member 10. In addition to the ON-time memory 6, there are provided an OFF-time memory 7, start-time memory 8, and an end-time memory 9, although not shown there also provided a plurality of ON-time memories or OFF-time memories. An OFF-time code $S_f$ stored in the OFF-time memory 7, a start-time code $S_s$ stored in the start-time memory 8, and an end-time code $S_e$ stored in the end-time memory 9 are also established by operation in the operating member 10. In the operating member 10, there are provided three time-setting, switches for setting the values of the respective figures of, for example, one-minute, ten-minute, and one-hour intervals and program change-over switches corresponding to the respective memories 6, 7, 8, 9, . . . To store the codes in the memories 6, 7, 8, 9 . . . the program change-over switches are selectively operated to generate a mode signal Pm, and then the time setting switches are operated to set a desired time. The mode signal Pm is fed to a change-over circuit 11 to control the circuit 11 by which the setting signals generated in the operating member 10 are supplied to the corresponding memories.

The time codes $S_o$ to $S_e$ stored in the memories 6 to 9 and the time code $S_t$ from the clock circuit 5 are fed to a change-over circuit 12. This change-over circuit 12 is controlled by the mode signal Pm as is the change-over circuit 11. In the normal clock mode, the time code St is selected by the change-over circuit 12 and then is fed to a display circuit 13, while in the program mode in which the program change-over switches of the operating member 10 are operated, the time code which is programmed is selected by the change-over circuit 12 and then fed to the display circuit 13. The display circuit 13 includes a decoder, which decodes the time code and then produces a display signal, and a drive circuit which is supplied with the display signal. The display signal from the drive circuit is supplied to a display member 14 which has four figure display patterns each of which has seven display segments arranged in a figure-eight array. The two patterns on the left are used to display the hour and the two patterns on the right are used to display the minutes. In this example, dot-shaped, display segments are located between the hour and minute patterns to distinguish the hour and minute displays. The display segments can be any of a variety of well known devices, such as the anode or cathode of a display discharge tube, a light emitting diode, or a liquid crystal display.

In this example, when a lock start time is to be set in the program mode, it is sufficient that the program change-over switch for the start time programming in the operating member 10 is pushed to display the time corresponding to the start time code $S_s$ on the display member 14, and, to advance the time setting of the lock start time, while the display on the display member 14 is monitored, the time setting switch of the operating member 10 is pushed. Each this switch is pushed, the unit of minutes, ten-minutes or hour is advanced to set a desired lock start time. After the above setting operation is finished, the display member 14 displays a present time. Though not shown, in the operating member 10, there are provided a cancel switch and a code generating circuit which will generate a memory release code (which does not correspond to any particular) when the cancel switch is made ON. Thus, the cancel switch can write a memory release code in a predetermined memory selected by the program change-over switch to release the program which is already stored therein.

In the example shown in FIG. 1, there are further provided a coincidence detector circuit 15 which is supplied with the time code $S_t$ and ON-time code $S_o$, a coincidence circuit 16 which is supplied with the time code $S_t$ and OFF-time code $S_f$, a coincidence detector circuit 17 which is supplied with the time code $S_t$ and start time code $S_s$, and a coincidence detector circuit 18 which is supplied with the time code $S_t$ and end time code $S_e$. When the two input codes to the respective coincidence detector circuits 15 to 18 coincide, the respective detected outputs $A_o$, $A_f$, $A_s$ and $A_e$ from the coincidence detector circuits 15 to 18 become high level ("1").

The relay winding 3 is connected between the output terminal of a flip-flop circuit 19 and ground. When an output Pc from the flip-flop circuit 19 is "1", the relay winding 3 is energized to close the relay contact 2 so that the latter connects the power supply of the television receiver 1. If, instead the output Pc is a low level ("0"), the relay winding 3 is not energized and the relay contact 2 is left open, so that the power supply of the television receiver 1 is disconnected.

The state of the flip-flop circuit 19 is inverted at every occurrence of the trigger pulse which is generated by operating a power switch 20, here a push-button, or by the switching operation of a transistor 21. A positive DC voltage $+V_{CC}$ is applied through the power switch 20 to the collector of a transistor 22 and is also applied directly to the collector of the transistor 21. The emitters of the transistors 21 and 22 are both grounded. Thus, when the power switch 20 is closed while the transistor 22 is conducting, or when the transistor 21 is conducting, the trigger pulse, which will become "0", is generated.

The output $P_c$ from the flip-flop circuit 19 is supplied through an inverter 23 to one input terminal of an AND gate 24 which is also supplied, at its other input terminal, with the detected output $A_o$ from the coincidence detector circuit 15. The output $P_c$ from the flip-flop circuit 19 is also supplied to AND gates 25 and 26. The AND gate 25 is also supplied with the detected output $A_f$ and the AND gate 26 is also supplied with the detected output $A_s$. Although not shown, the detected outputs from other coincidence detector circuits, which will detect ON-and OFF-times, and also the output $P_c$ or its inverted output from the flip-flop circuit 19, are supplied to AND gates. The outputs from the AND gates 24, 25, 26 and other AND gates are supplied to an OR gate 27 whose output is supplied to a monostable multivibrator 28 to trigger the same. The output from the monostable multivibrator 28 is applied to the base of the transistor 21.

When the power supply of the television receiver 1 is disconnected, i.e., when the output $P_c$ is "0", the detected output $A_o$ from the coincidence detector circuit 15 is "1". Thus, the monostable multivibrator 28 is triggered at the positive-going edge of the output $A_o$ and the transistor 21 is turned ON by the output from the monostable multivibrator 28. As a result, the output $P_c$ from the flip-flop circuit 19 becomes "1" to connect the power supply of the television receiver 1 at the predetermined ON time. When the output $A_f$ from the coincidence detector circuit 16 becomes "1" while the power supply of the television receiver is disconnected, the flip-flop circuit 19 is triggered, hence its output $P_c$ becomes "0" and the power supply becomes disconnected at the predetermined OFF time. Similarly, when the lock start time arrives while the power supply is connected, the transistor 21 is turned ON by the detected output $A_s$ delivered from the coincidence detector circuit 17 and hence the power supply is disconnected.

The detected output $A_s$ is further supplied to a differentiation circuit 29 to provide a differentiated output pulse is to a flip-flop circuit 30 at the positive-going edge of the detected output $A_s$. When the flip-flop circuit 30 is in the reset state, its output $P_i$, which is "0", is supplied to the base of the transistor 22. Accordingly, since the output $P_i$ becomes "0" after the start time, the transistor 22 then becomes turned OFF. In this condition, even if the power switch 20 is actuated, no trigger pulse for the flip-flop circuit 19 is produced and the power supply of the television receiver 1 is locked in its disconnected state.

The flip-flop circuit 30 can be set by the pulse generated from a differentiation circuit 31 at the positive-going edge of the detected output Ae from the coincidence detector circuit 18. Accordingly, when the detected output $A_e$ becomes "1" at the lock end time, the flip-flop circuit 30 is set and its output $P_i$ becomes "1". As a result, the transistor 22 becomes turned ON and the power supply is released from being locked in a disconnected or OFF state. Thus, the circuit locks the power supply such that, from the set start time to the end time, even if the power switch 20 is operated, the power supply of the television receiver 1 can not be turned ON.

It is possible to employ such a power supply lock that only during the time period between the appointed start time and the end time, the power supply of the television receiver can be connected and disconnected by actuating the power switch 20 and during the other time period the power supply of the television receiver can not be connected. To this end, it is enough that there be supplied the base of transistor 22 an inverse output $\overline{P_i}$ from the flip-flop circuit 30, which becomes "1" when the flip-flop circuit 30 is reset but "0" when the flip-flop circuit 30 is set.

If it is desired to do so, the power supply can be released from its lock state before the predetermined lock end time, by setting the ON-time code $S_o$ corresponding to the present time in the ON-time memory 6. It is also possible to provide a lock releasing switch to produce a pulse for setting the flip-flop circuit 30, although it is preferable not to include such a switch as it would make the lock too easy for a young child to release.

Further, when the power supply is locked OFF in a disconnected state if only the lock start time is set but the lock end time is not set, the lock continuously holds the power supply in the disconnected state. This results undesirably in that the apparatus erroneously appears out of order. To avoid this, whenever the lock end time is not set, that the setting of the lock start time be treated as an erroneous operation so that the set of a start time will be ineffective, or alternatively, when the start time is set but no end time is set, the end time code $S_e$ corresponding to a predetermined time, for example, three hours after the start time, is automatically set and stored in the end time memory 9.

As may be understood from the above explanation it is possible that the time in which the manual power switch is effective can be set to any desired time, for example, at dinner time, so that even if the power switch is actuated, the connection of power supply of the television receiver is prevented.

Since according to this invention no key is used, the loss of such a key does not present a problem, and even without a key, the power supply can conveniently be released from a locked state.

In addition, if the timing section is used both to set ON and OFF times and to generate the displayed time, the clock circuit, display circuit, and so on, can be efficiently utilized. Also, it is possible that even if the power supply is locked OFF in its disconnected state , the power supply of the television receiver can be made ON, or connected in a certain time period when television viewing is desirable.

Figure 2:
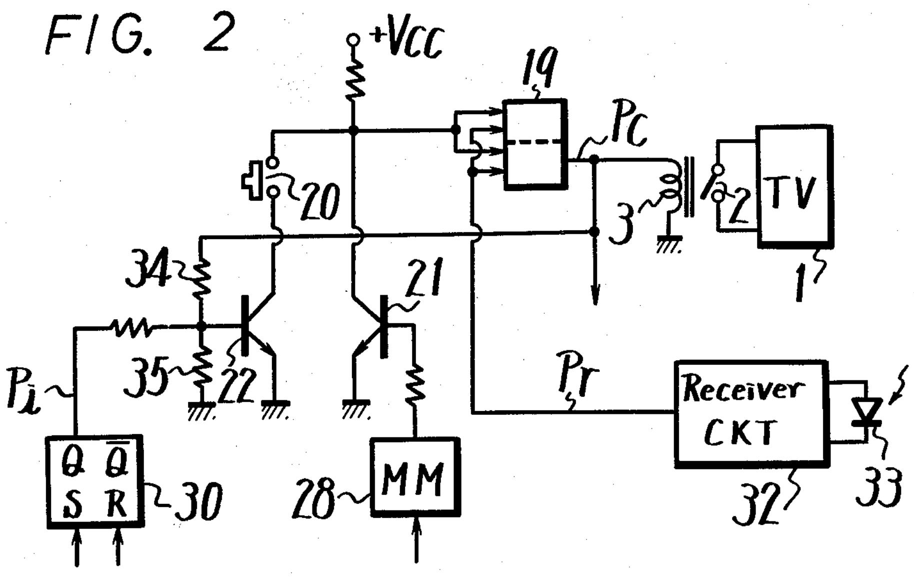
FIG. 2 is a block diagram showing essential parts of another example of the invention.

FIG. 2 shows a portion of another example of the invention. With this example, even if the power supply is locked so that the operation of the power switch 20 is ineffective, the power supply can be arbitrarily made ON and OFF by a remote control operation.

In FIG. 2, a receiver circuit 32 receives the remote control signal emitted from a transmitter (not shown). When a switch provided in the transmitter is pushed, a light emitting diode of the transmitter is made ON and OFF by a radio frequency signal with a predetermined frequency and produces a remote control signal of infrared light. The remote control signal of infrared light from the transmitter is received by a photo-diode 33 whose output is amplified and detected by the receiver circuit 32 which generates a negative control pulse $P_r$. At the negative-going edge of the control pulse $P_r$, the state of the flip-flop circuit 19 is inverted. Thus, even if the flip-flop 30 is in the state corresponding to the power supply lock state, the power supply of the television receiver 1 can be selectively connected to turn the receiver ON and OFF. Accordingly, a child can be prevented from watching television too much by setting the power supply OFF lock, but his parents can turn the television ON at a desired time by simply operating the transmitter. An OFF operation will be inconvenient if the power supply can be disconnected only by remote control. Therefore, in the example of FIG. 2, the output $P_c$ from the flip-flop circuit 19 is applied through voltage-divider resistors 34 and 35 to the base of the transistor 22 to make it possible, even if the flip-flop 30 is in the state corresponding to a power supply OFF lock conditioning, the power supply can be conveniently disconnected by using the power switch 20. The remaining structure of the example shown in FIG. 2 is substantially the same as that of the example shown in FIG. 1 and is omitted from the drawing.

Figure 3:
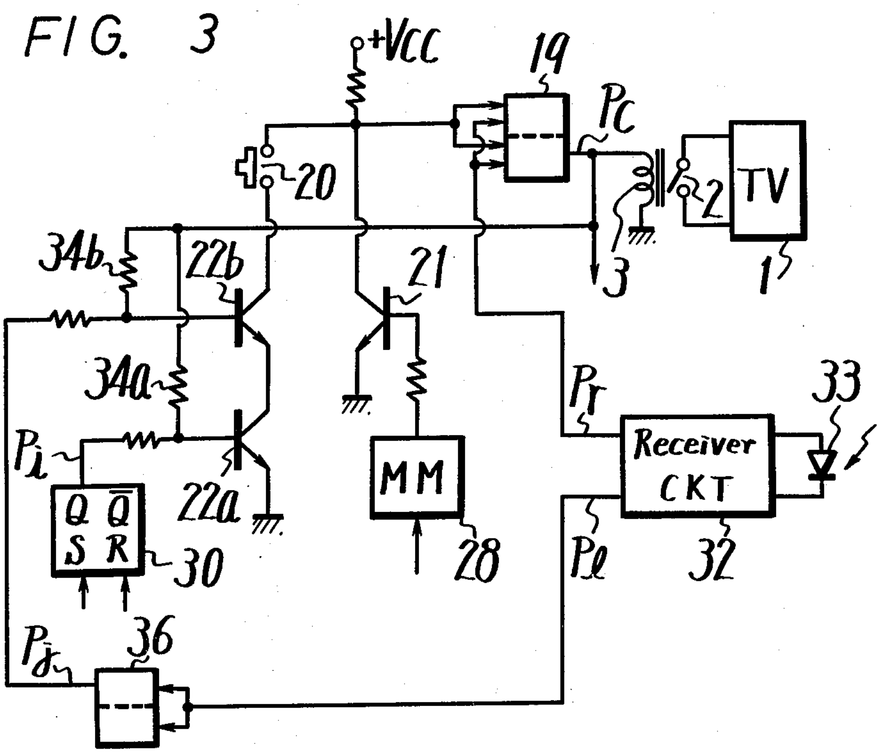
FIG. 3 is a block diagram showing essential parts of a further example of the invention.

FIG. 3 shows a portion of a further example of the present invention in which, as in the example of the invention shown in FIG. 2, the control pulse $P_r$ is produced in response to the remote control signal and the flip-flop circuit 19 is triggered by the control pulse $P_r$. Further, the power supply OFF lock is carried out at the predetermined time by the output $P_i$ from the flip-flop circuit 30, as in the example shown in FIG. 1 and the set and release of the lock state can be performed by the remote control operation.

In the remote control transmitter there are provided the switch for selectively connecting and disconnecting the power supply and the switch for setting and releasing the lock. By closing the respective switches, two remote control signals, which are distinguished in some way, such as in frequency, pulse width, code, or the like, are transmitted from the transmitter. The remote control signals are received and discriminated by the receiver 32 so that the receiver 32 produces two control pulses $P_r$ and Pl. The control pulse Pl is supplied to a flip-flop circuit 36 as a trigger pulse. Each time the control pulse Pl is supplied to the flip-flop circuit 36, the latter is inverted in state. An output $P_j$ from the flip-flop circuit 36 is applied to the base of a transistor 22*b* whose collector is connected through the power switch 20 and a resistor to the DC power supply terminal $+V_{CC}$, and whose emitter is connected to the collector of a transistor 22*a* whose emitter is connected to ground. The base of the transistor 22*a* is supplied with the output $P_i$ from the flip-flop circuit 30, as in the above examples and the output $P_c$ from the flip-flop circuit 19 is supplied through resistors 34*a* and 34*b* to the bases of the transistors 22*a* and 22*b*, respectively.

With the example of the invention shown in FIG. 3 when, on the one hand, the outputs $P_j$ and $P_i$ from the flip-flop circuits 36 and 30 are both "1", the transistors 22*a* and 22*b* are both turned ON and hence the operation of the power switch 20 is rendered effective to change the state of the flip flop circuit 19. While, when either one of the outputs $P_i$ and $P_j$ is "0", the ON power switch 20 is rendered ineffective. In this case, however, the connection and disconnection of the power supply may be carried out by a remote control operation and the power switch 20 is effective to disconnect the power supply.

Further, if the switches for lock set and release in the transmitter are closed to produce the control pulse Pl in the receiver circuit 32, such pulse, in turn, makes the output $P_j$ from the flip-flop circuit 36 "0".

At such time, if the power supply is disconnected ($P_c$="0") and even if the time does not correspond to that stored in the memory 8 and the state of flip-flop circuit 30 is ON ($P_i$="1"), the operation of the power switch 20 thereafter can be rendered ineffective. By contract, if the power supply is connected ($P_c$="1"), the operation of the power switch 20 can be similarly rendered ineffective after the power switch 20 is closed to disconnect the power supply.

Next, when the lock set and release switches in the transmitter are close again and the control pulse Pl is produced in the receiver circuit 32, the output $P_j$ of the flip-flop circuit 36 is inverted and becomes "1" , and as a result the power switch 20 is released from its locked state. Thus, the example of FIG. 3, except at the predetermined time, controls the operation of the power switch 20 so that the latter can be rendered ineffective from a present time to a desired time by actuating the remote control transmitter.

With the example of the invention shown in FIG. 3, depending on the intention of a person using the transmitter, the operation of the power switch can be rendered ineffective and also the connection and disconnection of the power supply can be controlled.

In the examples of the invention shown in FIGS. 2 and 3, it is unnecessary to use a key and hence the operation of the receiver remains unhampered in the event that the key is lost.

Further, if desired, a light emission element such as a lamp or the like can be used to indicate the period between the set lock start time and the lock end time or between the lock state set by the remote control operation and its release thereby to avoid erroneous diagnosis of trouble.

Further, it is possible to construct the power control apparatus to function so that, at the same time that the ON time of the power supply of the television receiver is also set, a channel to be received at the ON time is programmed. A channel change to such program can be effected such that a program channel code is fed at the ON time to the channel selection control apparatus of a tuner of an electronic tuning system provided with a variable reactance element as a tuning element.

It will be apparent that many modifications and variations could be effected by one skilled in the art without departing from the spirit or scope of the present invention, which is to be determined by the appended claims.

We claim as our invention

1. Power supply control apparatus for a television receiver having a power supply with ON and OFF states, comprising:

manually-actuable power switch means for switching the power supply of the television receiver between said ON and OFF states;

timing means for generating a time code representing the current time;

key input means for generating a start-time code representing a programmable start time and for generating an end-time code representing a programmable end time;

memory means for storing said start-time code and end-time code;

first coincidence detector means for detecting coincidence between the generated time code and said start-time code stored in said memory means and providing a first coincidence output when such coincidence is detected;

second coincidence detector means for detecting coincidence between said generated time code and said end-time code stored in said memory means and providing a second coincidence output when such a coincidence is detected; and conditioning means for conditioning said power switch means into an enabled condition in which said power switch means is manually actuable for said switching of said power supply and into a disabled condition in which said power switch means is prevented from said switching of said power supply, including means responsive to said first coincidence output for conditioning said power switch means into one of said enabled and disabled conditions and responsive to said second coincidence output for conditioning said power switch means into the other of said enabled and disabled conditions.

2. Power supply control apparatus according to claim 1; wherein said means for conditioning includes an RS flip-flop having set and reset inputs and an output switchable between set and reset states; said first coincidence output is supplied to one of said set and reset inputs; said second coincidence output is supplied to the other of said set and reset inputs; and the output of said RS flip-flop selectively enables and disables said manually actuable switch means.

3. Power supply control apparatus according to claim 1; wherein said manually actuable power switch means includes a triggerable flip-flop circuit triggerable between a first state and a second state in response to a trigger signal, manually actuable trigger switch means for generating said trigger signals, and control means for switching said power supply between said ON and an OFF states in correspondence with said first and second states of said triggerable flip-flop circuit.

4. Power supply control apparatus according to claim 3; wherein said conditioning means includes an RS flip-flop having set and reset inputs and an output switchable between set and reset states, said first coincidence output is supplied to one of said set and reset inputs, said second coincidence output is supplied to the other of said set and reset inputs, and the output of said RS flip-flop selectively enables the generation of said trigger signal to said triggerable flip-flop.

5. Power supply control apparatus according to claim 3; further comprising additional trigger signal generating means independent of said manually actuable trigger switch means for supplying a second trigger signal to, said triggerable flip-flop circuit to trigger the same.

6. Power supply control apparatus according to claim 5; wherein said additional trigger signal generating means includes receiver means for providing said additional trigger signal to response to a remote-control signal received thereby.

* * * * *